US009426530B2

(12) United States Patent  
Logan et al.

(10) Patent No.: US 9,426,530 B2  
(45) Date of Patent: Aug. 23, 2016

(54) METHODS AND APPARATUS FOR CREATING, COMBINING, DISTRIBUTING AND REPRODUCING PROGRAM CONTENT FOR GROUPS OF PARTICIPATING USERS

(75) Inventors: James D. Logan, Candia, NH (US); Mark Palmer, Northboro, MA (US); Charles G. Call, Marco Island, FL (US)

(73) Assignee: OL Security Limited Liability Company, Dover, DE (US)

( * ) Notice: Subject to any disclaimer, the term of this patent is extended or adjusted under 35 U.S.C. 154(b) by 1156 days.

(21) Appl. No.: 13/283,838

(22) Filed: Oct. 28, 2011

(65) Prior Publication Data

US 2013/0110921 A1 May 2, 2013

Related U.S. Application Data

(62) Division of application No. 11/708,692, filed on Feb. 20, 2007, now Pat. No. 8,051,130.

(60) Provisional application No. 60/774,993, filed on Feb. 18, 2006.

(51) Int. Cl.

| G06F 15/16 | (2006.01) |
|---|---|
| H04N 21/4788 | (2011.01) |
| G06F 17/30 | (2006.01) |
| H04N 21/6405 | (2011.01) |

(52) U.S. Cl.  
CPC ...... *H04N 21/4788* (2013.01); *G06F 17/30053* (2013.01); *H04N 21/6405* (2013.01)

(58) Field of Classification Search  
CPC .............. G06F 17/30053; H04L 65/4007; H04L 65/4015; H04L 65/403; H04L 65/4076; H04L 65/4084

USPC ................................................. 709/203–206  
See application file for complete search history.

(56) References Cited

U.S. PATENT DOCUMENTS

| 6,690,943 B1 | 2/2004 | Forde et al. |
|---|---|---|
| 7,124,164 B1 | 10/2006 | Chemtob |
| 7,143,428 B1 | 11/2006 | Bruck et al. |
| 7,647,614 B2 | 1/2010 | Krikorian et al. |
| 7,702,728 B2 | 4/2010 | Zaner et al. |
| 7,716,376 B1 | 5/2010 | Price et al. |
| 2003/0056220 A1 | 3/2003 | Thornton et al. |
| 2003/0212804 A1 | 11/2003 | Hashemi |
| 2003/0220970 A1* | 11/2003 | Komsi ........................ 709/204 |
| 2004/0137882 A1* | 7/2004 | Forsyth ..................... 455/414.1 |
| 2005/0125843 A1 | 6/2005 | Okezie et al. |
| 2005/0239486 A1 | 10/2005 | D'Avello et al. |
| 2005/0262542 A1 | 11/2005 | DeWeese et al. |

(Continued)

FOREIGN PATENT DOCUMENTS

JP 2000188743 7/2000

*Primary Examiner* — David Lazaro  
(74) *Attorney, Agent, or Firm* — Meyertons, Hood, Kivlin, Kowert & Goetzel, P.C.

(57) ABSTRACT

A communications system for simulcasting audio or audio-visual program content to a plurality of participating system users via a communication network. Each user operates an access device that reproduces the received program content for the user and also accepts spoken comments from the user concurrently with or immediately following the reproduction of the program content. The spoken comments are transmitted to at least selected ones of the other users so that the selected users can engage in a conversation about the program content as it is simulcast.

16 Claims, 2 Drawing Sheets

(56) References Cited

U.S. PATENT DOCUMENTS

| | | | |
|---|---|---|---|
| 2006/0143236 A1* | 6/2006 | Wu | 707/104.1 |
| 2006/0148512 A1 | 7/2006 | Ekholm et al. | |
| 2006/0221173 A1 | 10/2006 | Duncan | |
| 2007/0124737 A1 | 5/2007 | Wensley et al. | |
| 2008/0040354 A1 | 2/2008 | Ray et al. | |

* cited by examiner

METHODS AND APPARATUS FOR CREATING, COMBINING, DISTRIBUTING AND REPRODUCING PROGRAM CONTENT FOR GROUPS OF PARTICIPATING USERS

CROSS-REFERENCE TO RELATED APPLICATIONS

This application is a division of, and claims the benefit of the filing date of, U.S. patent application Ser. No. 11/708,692 filed on Feb. 20, 2007 which was a non-provisional of U.S. Provisional Application Ser. No. 60/774,993 filed on Feb. 18, 2006. The disclosures of the foregoing applications are incorporated herein by reference.

The present invention makes use of methods and apparatus described in the following related U.S. Patents and a Patent Application Publication, the disclosures of which are incorporated herein by reference:

U.S. Pat. No. 5,732,216 issued to James D. Logan et al. on Mar. 24, 1998 entitled "Audio Message Exchange System;"

U.S. Pat. No. 5,721,827 issued to James D. Logan et al. on Feb. 24, 1998 entitled "System for Electrically Distributing Personalized Information;"

U.S. Pat. No. 6,199,076 issued to James D. Logan et al. on Mar. 6, 2001 entitled "Audio Program Player including a Dynamic Program Selection Controller;"

U.S. Pat. No. 6,816,577 issued to James D. Logan on Nov. 9, 2004 entitled "Cellular Telephone with Audio Recording Subsystem;"

U.S. Pat. No. 6,788,766 issued to James D. Logan on Sep. 7, 2004 entitled "Methods and apparatus for providing location dependent cellular telephone communications," and U.S. Pat. No. 7,769,364 issued to James D. Logan et al. on Aug. 3, 2010, entitled "On demand voice mail recording system."

FIELD OF THE INVENTION

This invention relates to electronic media creation, delivery and playback systems.

BACKGROUND OF THE INVENTION

There are several emerging trends in the media industry that influence and facilitate the development of the present invention, including the following:

Content Creation: A radical democratization of the media creation process is underway, due to the distribution opportunities offered by the Internet and advances in content creation technology such as low-cost camcorders and music production systems. An aspiring entertainer can acquire a large audience without a label signing by using popular social network sites like MySpace®.

Content Licensing: The market for licensing of content such as music is becoming more robust and efficient. There are now services such as iTunes® where users can purchase single songs, subscription services such as Rhapsody® where users can have access to any song whenever desired so long as a monthly fee is paid, and Internet Radio where anybody can host a stream so long as certain playlist rules are followed and certain royalties are paid.

Collaborative Filtering: With listeners now having access to any song at any time, the challenge then becomes deciding what to listen to. People increasingly choose what to listen based on shared tastes and suggestions from friends. By 2010, it is estimated that 25% of online music store transactions will be driven directly by consumer-to-consumer taste sharing applications, such as playlist publishing and ranking tools. Thus people are relying on other people to decide what to play and what new music to explore.

Infrastructure and Hardware: Cell phone networks are being upgraded to 3G and other higher bandwidth platforms, and handsets are being augmented with the capability to receive streamed media content. Cell bandwidth is becoming cheaper and faster, and services such as Push to Talk are being more popular. Push to talk is now able to allow calls to 90 people simultaneously.

SUMMARY OF THE INVENTION

The following summary provides a simplified introduction to some aspects of the invention as a prelude to the more detailed description that is presented later, but is not intended to define or delineate the scope of the invention.

In its preferred embodiment, the present invention takes the form of a system, here called the "Open Channel System," for delivering program content to, and for concurrently enabling communication between, a plurality of participating users. The Open Channel System employs a first communications pathway for simultaneously sending the program content to a plurality of different program receivers, here called "Open Channel Receivers," each of which is operated by one of the participating users. The system employs a second, bidirectional communications pathway, which may be implemented by the same or a different communications facility, for coupling the members of a group of the participating users during or immediately after the transmission of the program content to establish a spoken conversation between the members of the group. A supervisory controller operable by a managing user, here called the "DJ" or "Disk Jockey," is used to select and transmit the program content to the participating users and to grant access to the use of the bidirectional communications pathway to the participants in the spoken conversation.

The DJ may select at least some of the program content in response to requests or preference indications received from at least some of said participating users, and may grant access to the bidirectional communications pathway in response to access requests received from participating users.

The program content simulcast to the participating users may be specified by a playlist file containing an ordered list of program segments. The system may incorporate an editor used by the DJ, or others, for modifying the playlist to vary the designated program segments or the order in which those segments are simulcast. The supervisory controller may inhibit the operation of the bidirectional pathway when at least a portion of at least some of said program segments is being transmitted.

Individual members of the group participating in the conversation may control the relative volume at which the received program content is played back relative to the volume at which the conversation is played, and may "mute" the transmission of spoken comments from that individual member. Individual members may also establish private connections with one or more other participating users.

The Open Channel System may simulcast video as well as audio content to participating users, and may exchange images or video clips between users as well as spoken comments via the bidirectional "conversation" channel. The Open Channel System may employ a web site or the like for establishing subscription agreements which specify the terms upon which the system will be used by subscribing participating users, and/or the Open Channel System may be used to supplement the services offered by existing subscriber-based content delivery services, such as Video on Demand services offered by cable companies, IPTV services, and online programming offered to subscribers via the Internet. The Open Channel System may further deliver advertising program segments to participating users.

The present invention contemplates combining the point-to-point, fixed-duration connections now typically provided by wireline, cellular and Internet telephone connections with new modes of "constant contact" or "constant operation". The illustrative embodiment of the invention described below provides users with connectivity to both program content and social communication through a facility called an "Open Channel" that allows one or more participating users to listen to, and add to, an audio program content stream at the same time the stream is being listened to. An Open Channel provides bidirectional communications capabilities that are similar to a conference call, except that a music stream provided to participating listeners in as high fidelity as possible is transmitted or "simulcast" to all participants most of the time the Open Channel is active. Telephones and other communications devices which are used to receive and reproduce content via an Open Channel are referred as Open Channel Receivers (OCRs), including cellular, VoIP, WiFi and wireline telephones, personal computers, PDAs, music players, cable "set top boxes," and radio and television broadcast receivers.

The specific preferred embodiment of the invention to be described, a system here called "the Open Channel System," provides a new form of audio entertainment, which may be termed "Social Listening," that combines music or video streaming with a conference-call connection technology. It envisions small groups of listeners sharing a common audio connection to a program source over a cellular network, VoIP Internet connections, or the public switched telephone network. The Open Channel System allows friends, or even strangers, to listen to or view a common program stream at the same time. In addition, bidirectional communications connections are established via the Open Channel that allows some or all of the participating listeners to talk to one another under controlled conditions before, during, and after the time a song or other program material plays.

In the preferred embodiment, the program content is defined by one or more editable playlists that may be authored or personalized to a group's tastes, and may be interactively modified as they are played. In one embodiment, the Open Channel System may be viewed as providing a new radio format, where most of the listeners are cell phone users who are participating in a conference call as they listen to music played by a "DJ" (disk jockey) who is typically one of the people participating in the conference call. Unlike conventional radio stations, the audio content provided by the Open Channel System through a selected Open Channel provides an ephemeral group listening, and the music or other audio content presented may be repeated in subsequent time periods to other groups of listeners.

The Open Channel System offers significant advantages not provided by conventional media. First, the Open Channel System offers a new way to find music or other content that is likely to match a given listener's taste in a world that is over-flowing with choices. Secondly, the Open Channel System offers a new, more interesting way to listen to or watch program content, one that is less sterile and predictable than listening to straight playlists of songs as one does when listening on an music player such as an iPod® or to a CD. Today, over 75% of music listening in cars occurs using the radio rather than listening to CDs. This is because radio brings life to an otherwise pure music medium by the introduction of randomness in the musical selections played, a DJ's voice and even advertising. The popularity of "talk radio" has also shown the appeal of listening to strangers converse about any number of topics, the popularity of cell phones is proof of peoples' propensity to chat endlessly. The Open Channel System combines these random music selections with human conversation and makes it conveniently available to cell phone users.

The Open Channel System offers a form of social listening, where one listener may know who else is listening at any moment in time. It is also participatory, and social, in that the specific content played can be a function of group inputs. In this regard, it is similar to playing music on a jukebox in a public forum or at a party. In these environs, multiple participants can play their favorite songs, jockey for position in the queue, and interact and talk with peers—all while everybody listens to the same music.

The Open Channel System goes beyond other music sharing forums, such as those found on the popular Internet web site MySpace®, in that not only can users share their playlists, but they can let others listen to their playlists at the same time the creator of the playlist is listening to it. Feedback and commentary can be synchronous with the playing music. Friends can listen to the group playlists while commenting over the music and influencing the selections dynamically.

The framework of social listening which the Open Channel System provides may also support other types of programming content types, such as newscasts, podcasts, talk radio sessions, or RSS text reader feeds rendered to speech. While the predominate focus of the preferred embodiment described below evolves around audio, and particularly music, it should be understood that in cases where bandwidth and display capabilities permit, accompanying images or full-motion video, in particular from music video recordings, can also be delivered. Accordingly, although users of the system will be frequently referred to as "listeners," it should be understood that these users may also be "viewers" of content delivered through the "Open Channel." In a system that supports visual displays, the visual component presented to all participants (still images or full motion video) may be the visual component of the simulcast program content segments as those segments are transmitted, and may be an image representative of the individual speaker (e.g. a photograph or an avatar, or a full motion "videophone" picture), switching the image to that person who is speaking while "conference call" type conversations are going forward between program segments.

It should also be understood that, although the embodiment described in detail below can be accessed and used by cellular or WiFi phone users, the instrumentalities that may be used to provide the communications capabilities that implement an "Open Channel" may be provided by a variety of communications networks, some of which may be used in combination to transfer the program content to listeners, to provide bidirectional communications between listeners, and to transfer the control commands between participating listeners and system administrators and the program delivery mechanisms which provide desired system functions.

BRIEF DESCRIPTION OF THE DRAWINGS

In the detailed description which follows, frequent reference will be made to the attached drawings, in which.

DETAILED DESCRIPTION

Overview

Figure 1:
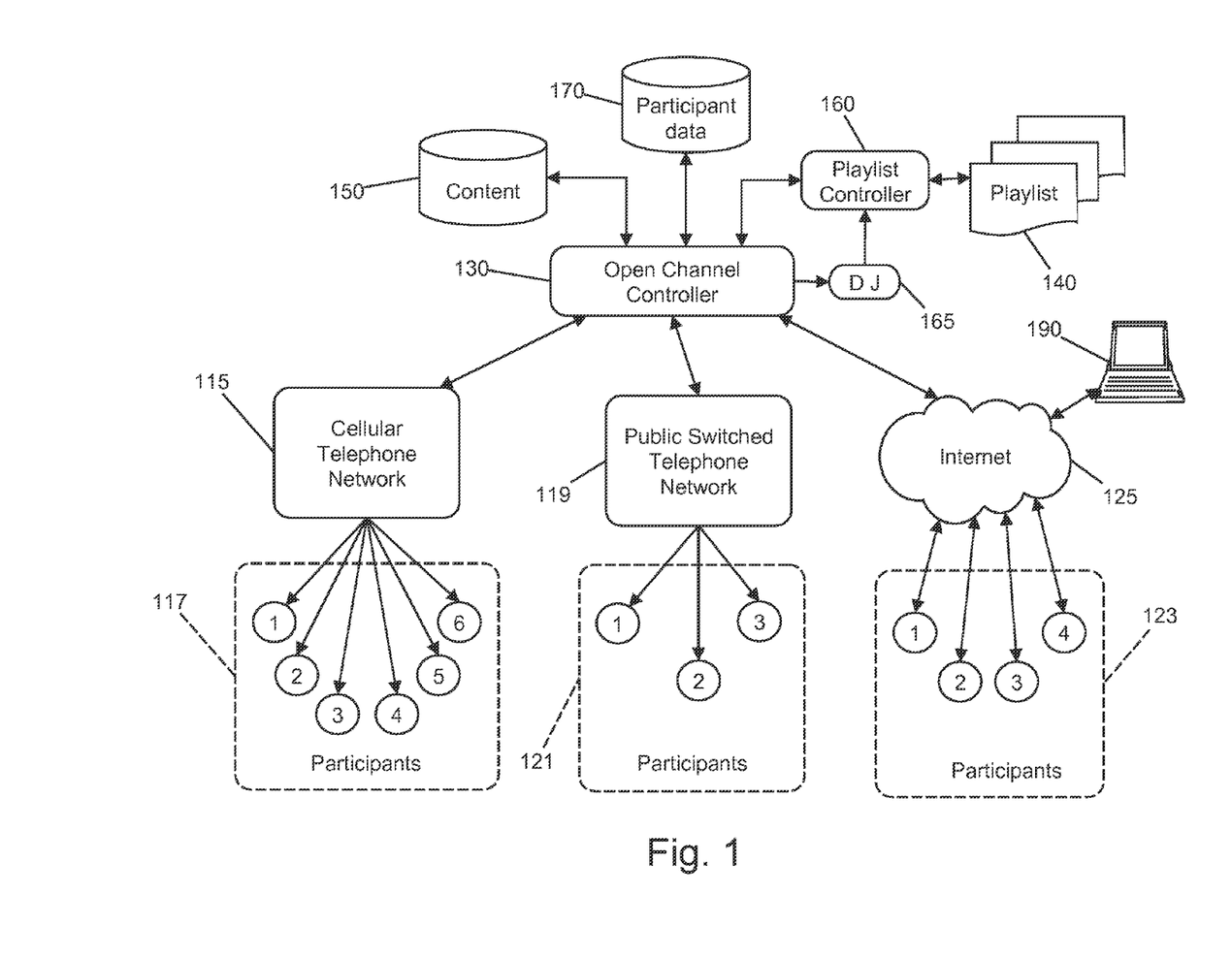
FIGS. 1 and 2 are functional block diagrams illustrating the organization and function of the principle building blocks of an embodiment of the invention

The Open Channel System makes an Open Channel (Open Channel) available to a group of participating users who receive content from the Open Channel via different communication facilities, as illustrated in FIG. 1. In this illustrative example, one or more cellular telephone networks is illustrated by the network seen at 115 in FIG. 1 which serves the six participants seen at 117. At the same time, the public switched telephone network 118 is used to connect the three participating users 121 to the Open Channel, and four additional participating users seen at 123 are connected to the Open Channel via the Internet 125.

Each of the 13 participating users seen in FIG. 1 is connected via one or more communication pathways which may be implemented in a variety of ways to an Open Channel controller 130. The controller 130 transmits an audio (and possibly a video) content stream to each participant. The content stream typically consists of the combination of a sequence of program segments which may be mixed with spoken comments (and possibly image content) received from participating users and retransmitted to other participants who are monitoring the Open Channel. The communication links connecting the individual participants to the Open Channel controller 130 are bidirectional, thus permitting each participant to not only monitor the audio stream being sent from the Open Channel controller 130, but also permitting at least selected participating users to transmit spoken comments, other content, and control commands to the controller 130.

In the discussion that follows, participating users may assume different roles. All of them have the ability to monitor the audio, image or video content transmitted from the Open Channel Controller, and these users will frequently be referred to in this description as "listeners" with the understanding that listeners may also be viewing content as well. Some of these participants may perform other functions: they may create an Open Channel and define its characteristics; they may author or modify playlists and create or identify the program segments specified in these playlists; they may perform the functions of a DJ (disk jockey), supervising the operation of an active Open Channel, and they may perform a variety of control functions which affect the manner in which they participate as listeners when connected to an Open Channel.

The Open Channel controller 130 performs numerous functions which will be described in more detail below, including: establishing a communication connection with each participant; controlling access to an Open Channel by persons who ask to be connected; providing a control interface, such as spoken or displayed prompts and menu options, and accepting a variety of commands and requests from participating users and potential users; providing an interface that allows users and others to create Open Channels and to define their characteristics and access privileges; providing an interface that allows users and others to author, edit and store playlists; performing enrollment and accounting functions for new subscribers and monitoring usage by existing subscribers; accepting express preference information from participating users, and/or creating preference data based on the use of the system by individual participants; creating and storing metadata which describes individual program segments and individual playlists to facilitate matching of program and playlist content with the known or probable preferences of users and sets of users; establishing "buddy lists" and other relationships between different users to promote socialization; and numerous other functions to be described in more detail in the description that follows.

The sequence of program segments which are transmitted in the audio stream to participating users is preferably (but not necessarily) defined and controlled by a selected playlist which can be selected from a library of available stored playlists seen at 140 whose use may be limited in ways defined by the playlist author or editor. Each playlist is implemented by an editable file of metadata which identifies program segments (for example, by their file name in a content store seen at 150, or by a URL which identifies a content resource which can be accessed via the Internet. A playlist controller seen at 160 reads a selected playlist from the playlist library 140 to identify the content files which are to be fetched and routed to the participating users as part of the output content stream. As described below, the content store 150 may include songs, recorded talk, video clips, and the like uploaded by an individual user in advance of an Open Channel session or placed in the library for use by playlist authors or extemporaneous use by a DJ during a live session. Playlists may identify program segments in the store 150 or at accessible locations on the Internet.

Playlists in the library 140 are typically created in advance for use by one or more Open Channels. As described in more detail later, a playlist may be created or modified by a participating user, or by a different author or editor, and placed in a playlist library. In addition, for any given Open Channel session, a DJ (disk jockey) seen at 165 supervises the entry of participants into the session and exercises supervisory control over the session. The DJ may be one of the participating users, a person employed by the system operator, or an automated system, or a combination of these entities. The DJ 165 has the ability to edit or modify the playlist associated with a session. For example, the DJ may change the order in which program segments on the selected playlist are directed into the output stream, may add new segments to the playlist, or delete existing segments. Frequently, the DJ may perform these functions at the request of individual participants, or may do so to better accommodate the known preferences of the persons who form the set of participants currently connected to the Open Channel. Modified playlists may be stored in the library 140, retaining the previous version for separate use.

In its preferred embodiment, the functions performed by the Open Channel Controller 150, the data stores 150 and 170, and the playlist controller 160 and the playlist library 140 are implemented at one or more central locations and accessed on a client-server basis by the Open Channel Receivers operated by participating users. The features and functions of the system can however be performed on a distributed basis by the Open Channel Receiver themselves. For example, an Open Channel may be created and hosted by one Open Channel Receiver which stores the playlist and either locally stores the content of the program segments, or accesses them from an available source prior to transmitting them in a content stream to other participating users. In such an arrangement, the operator of the originating Open Channel Receiver would operate as the DJ, but could seamlessly pass that function to another participating Open Channel Receiver which could then share music and playlists that the transferee phone was storing or accessed. In a distributed system, one or more of the Open Channel Receiver's may be implemented by WiFi equipped music players that communicate with other players via the Internet, via a local wireless network or by direct computer-to-computer wireless links. When music is being shared between participants who are near to one another, it is desirable to closely synchronize the playback so that the participants can experience the shared rhythm of the music. Mechanisms for achieving close synchronization are described in U.S. Patent Publication No. 2005/0286546 entitled "Synchronized media streaming between distributed peers" filed by Arianna Bassoli et. al.

The creation and management of Open Channels as well as other administrative functions may be performed from a remote web browser seen at 190 connected to the Open Channel Controller via an Internet Web interface. It should be understood that the Open Channel Controller may be implemented by a plurality of different servers, including a web server, a file server, a database server, and the like, as well as a variety of different communications interfaces to telephone networks and the Internet. These instrumentalities may reside on a single computer or on a several different computers in distributed locations, FIG. 2 of the drawings illustrates the relationship between program segments, playlists, an individual "Open Channel" (Open Channel), and the audio stream that is reproduced for and individual participants.

Figure 2:
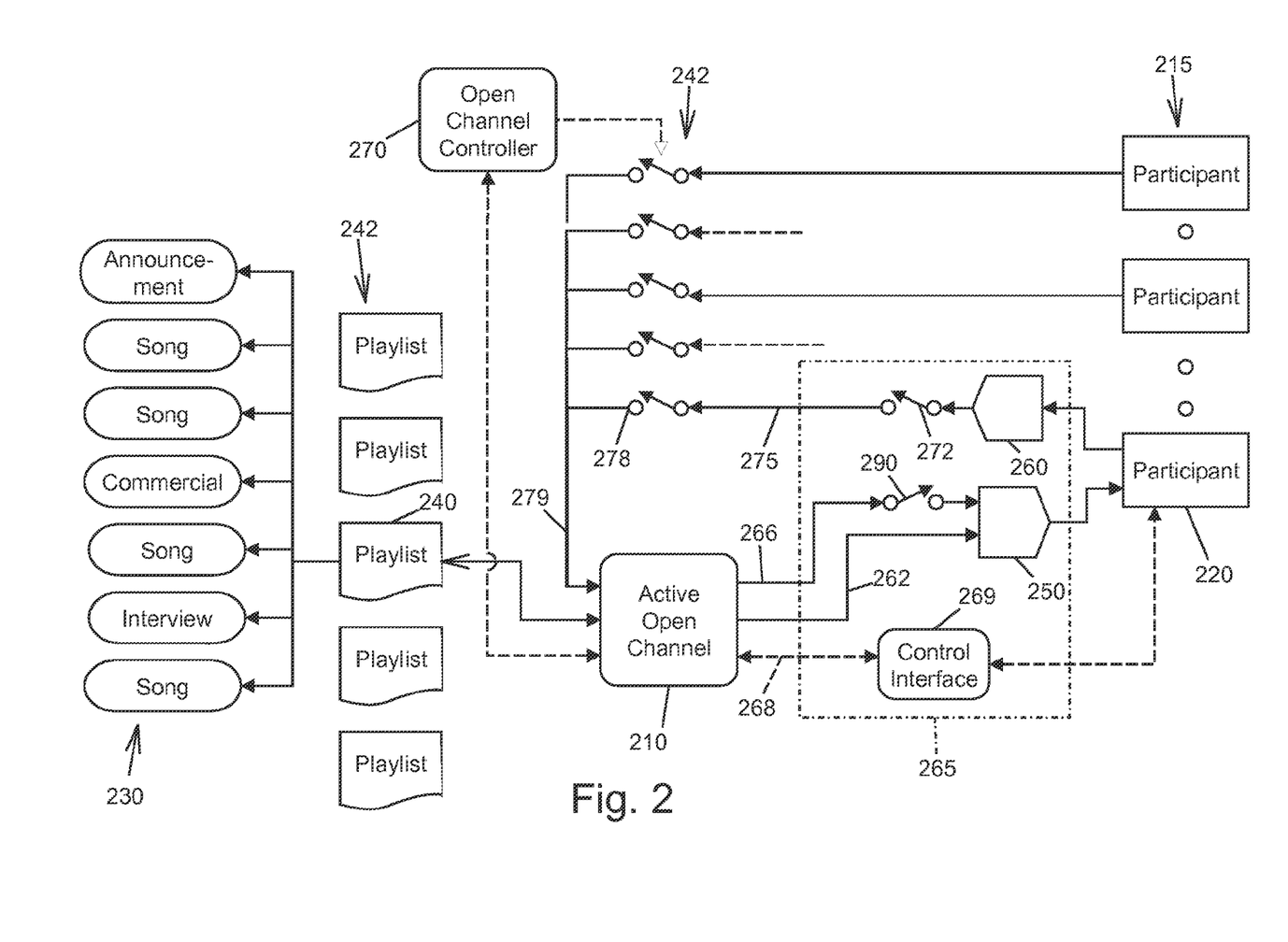

At any given time, the Open Channel System may make available multiple, concurrently operating Open Channels, some of which may be active and others inactive. Each Open Channel is associated with a selected one of multiple available playlists from the playlist library 140 seen in FIG. 1. As seen in FIG. 2, the Open Channel 210 is "active;" that is, it is currently generating an audio stream which can be monitored by a set of participants 215 who are connected to the Open Channel 210. One of the participants that is connected to the active Open Channel 210 is seen at 220 in FIG. 2. The Open Channel 210 delivers a sequence of program segments illustrated at 230, each of which is identified in an editable ordered list contained in the selected playlist 240 in the playlist library indicated at 242. The active Open Channel 210 establishes a playback position within the playlist 240, the playback position being a combination of the particular segment in the listed group 230, and a playback position (offset) within that selected segment. Thus, as illustrated by the connections 241 and 243, at any given time the audio stream routed to the participant 220 via the outbound link 250 is "playing" the content from the current segment specified in by the playlist 240. Suitable mechanisms for structuring playlists and controlling the playback from a playlist of content segments are described in more detail in the above-noted U.S. Pat. No. 6,199,076 issued to James D. Logan et al. on Mar. 6, 2001 entitled "Audio Program Player including a Dynamic Program Selection Controller," the disclosure of which is incorporated herein by reference.

The Active Open Channel 210 provides three separate outbound information bearing communications links that are connected, possibly over different communications facilities, to the receiving Open Channel Receiver operated by each participant. As illustrated in FIG. 2, an outbound link 262 transmits the content being played under the control of the playlist 240 to the content receiver 250 in the Open Channel Receiver 265 operated by participant 220. The outbound link 266 carries comments and other content supplied from other participants as selected by the switch bank 242. The receiver 250 preferably includes separate volume controls that allow the volume for the content received via link 262 to be adjusted independently of the volume of the link 266 carrying the conversation between active participants. Different people could use different ratios of voice vs. music loudness.

The control switch 290 may be opened by the participant 220 to separately and completely silence any comments from other participants, possibly so that the content from playlist 240 received via link 262 can be enjoyed without unwanted interference. When the listener talks (into a microphone not shown), and is not wearing headphones, the volume of both the playlist content and conversations from others may be automatically reduced to eliminate echo and feedback effects. Speaker-Microphone combinations, such as Logitech® speakerphones incorporating the RightSound™ technology have been developed for applications such as VoIP telephony and conferencing using a PC. These devices include echo cancellation processing that permits the use of speakers and a microphone without the need of a headset. Voice recognition may be used to identify a phrase that may be spoken to activate the listener's microphone to inject a comment while at the same time reducing the volume of the received audio to help insure that a participating listener does not introduce echo effects and feedback into the conversation channel.

In a playback system with multiple speakers, including stereo or multi-channel surround sound systems, the different sources could be played back through different speakers giving each channel a spatial separation that would be conducive to keeping the various sound sources clear in the listener's head. Different people could be assigned different audio channels if available, thus allowing multiple voice signals to be separated as well.

On request, a listener may establish a private conversation with one or more other participants, excluding the others. To accomplish this, the requesting listener employs a menu to select the others who are to be included, transmits the selection via the control interface 269 to the Open Channel Controller, which then sends a notification message to the persons who are asked to join the private conversation. As soon as one of those requested consents, the Open Channel Controller establishes connections between the requesting listener and each of the consenting participants.

Furthermore, in a playback system with multiple speakers, the different sources could be played back through different speakers giving each channel a spatial separation that would be conducive to keeping the various sound sources clear in the listener's head. Different people could be assigned different audio channels, as well, if there were enough, thus allowing multiple voice signals to be separated as well. In addition, outbound control commands are exchanged via the bidirectional control data link 268 between the control interface 269 in the Open Channel Receiver 265 and the Open Channel Controller 270. The control link 268 may, for example, be provided by a WAP Web Internet connection that permits the user to select and transmit menued commands to the Open Channel Controller 270 to perform a variety of operations. Note that control link 268 is typically available to the participant even when not connected to a specific Active Open Channel, and may in fact be used to select and connect to an available channel listed by the menu system.

The participant 220, when connected to and listening to the active Open Channel 210, may transmit content, such as spoken comments, via the response transmitter 260, a muting switch 272 operated by the participant, and then via an available return communications pathway 275 and a further control switch 278 in the switch bank 242 to an input port of the Active Channel 210. The participant 220 can open the muting switch 272 to prevent spoken comments from being broadcast to the other participants via the Active Open Channel 210. The DJ or others supervising the operation of the Active Channel 210 may open and close the switch 278 in switch bank 242 to control when spoken comments or other content from the participant 220 is transmitted via the combined input line 279 to link 266 via the Active Open Channel 210. For example, the DJ may elect to open all of the switches in switch bank 242 when nothing but the content designated by the playlist 240 is to be transmitted via the Active Open Channel 210. The switch bank 242 operates under the control of the Open Channel Controller 270, either automatically or in response to commands from the DJ 165 or a system administrator 190 as seen in FIG. 1, to permit or suppress comments from all or selected participating users. The content returned by participating users that is sent via the link 266 supplements the playlist content sent vial link 262, usually between segments. A second control switch 290 shown in FIG. 2 may be controlled in response to commands from the participant 220 who may elect not to hear comments from other users. Likewise, the DJ (or an automated system) may accept and retransmit content from users at any time. The content received during a segment playback may be recorded and played back later between segments, possibly before "live" comments are played, but may open switch 290 for all participants to prevent any "live comments" from being transmitted when another segment is being transmitted.

To briefly summarize, it may be seen that each "playlist" describes and defines an ordered list of program content segments, an "Open Channel," when active, can transmit the content specified by the associated playlist as audio content stream that is made available to connected users, and the system further provides a mechanism for accepting comments in spoken form all or a subset of the connected participating users, and for combining those comments with the playlist controlled content being transmitted to the participating users.

Using Push to Talk Over Cellular (PoC)

The present invention may be implemented by combining a playlist-controlled program content generator and a communications system that conforms to the OMA Push to talk over Cellular (PoC) architecture. PoC may be used, for example, to implement the communications between users via links 266 and 279 seen in FIG. 2. PoC may also be used to control which users participate in a given Active Open Channel session.

OMA PoC standard network architecture has been developed and specified by The Push to talk over Cellular (PoC) Working Group of the Open Mobile Alliance Ltd., and industry standards group. Cellular phone systems which implement PoC are available from Motorola, Nokia and others. Using PoC, the participant database 170 identifies provisioned users and their service profiles. The users and talk groups can be arranged in the database in closed user groups to support security and administration capabilities. The push to talk system can be scaled up to multimillion user networks with several networked PoC application servers. OMA PoC standard network architecture also includes a shared Group and List Management server for pre-defined groups.

The PoC push to talk service is based on multi-unicasting. Each sending client sends packet data traffic to a dedicated push to talk server and, in the case of a group call, the server then duplicates the traffic to all participating users in a group. PoC call control and other signaling are based on the IETF-defined SIP and voice traffic is carried through an RTP/RTCP based streaming bearer. Mobility is handled through (E)GPRS using support wide-area roaming over GSM/WCDMA.

PoC supports various types of groups to meet the differing needs of group communication. The main differences between these types relate to group management. In dial-out group communication, a user invites a group of users to participate in a group session. The invited users receive an indication of the incoming session and they may join in using either automatic or manual answer. The invited group may be a predefined group or a list of users selected from the buddy list as a temporary arrangement. In the latter case in particular, the ability to see other users' availability, or presence status, before making the dial-out call brings clear additional value for the user. A dial-out session suits unplanned situations or cases where the participants must be handpicked. On the other hand, dial-out sessions made to a predefined group may be irritating for those group members who are not interested in participating at that time.

In join-in group communication, the participants themselves explicitly join a group session for communication. In this way users have full control over which groups they participate in. They will never receive any traffic unless they have joined the group. Join-in operation is well suited for communication during routine or pre-planned activities. Participation in a join-in group is analogous to real-life activities such as watching TV, going to a movie or participating in a meeting. Join-in sessions can go on for hours, with actual communication comprising only a small portion of the total session time. So being in a join-in session should not prevent a user receiving other calls in the meantime.

The user should also be able to participate in (scan) several join-in sessions (Open Channels) simultaneously (multi-session support). A join-in group can be an open group without any access control or a closed group with a list of members. It can also have folder-based access control without having an explicit member list. Open join-in groups are suitable as open discussion forums on general and specific topics. Specific groups of people, such as families and hobby groups, can also use them if they do not feel the need to impose strict access control. Closed join-in groups are best suited to the needs of users where continuous communication within secure groups desired. PoC is a bearer-independent client-server application and can be introduced not only on cellular phones but also on PCs using either a fixed connection to the operator domain or cellular access.

In accordance with the present invention, high fidelity music packets may be streamed into a PoC session by application server software which uses a standard PoC system to administer connectivity. For example, the Nokia Software Development Kit (SDK) for PoC may be used to incorporate functionality from the Nokia IP Multimedia Subsystem (IMS) which may be used to implement other IP Multimedia communication sessions, such as interactive gaming and video sharing. The IP Multimedia Subsystem (IMS) is defined by 3GPP, and leverages existing 3GPP, OMA and IETF specifications. The Nokia PoC SDK provides a high-level Java™ API and hides the complexity related to the PoC communication signaling, voice coding and so on. Similar support for PoC is available from Ericsson, Siemens, Motorola and other participating cellular system vendors.

A Video Open Channel System

Just as an audio Open Channel Experience can replicate the ability of listeners in a car to share a listening experience, and comment on the program material being listened to, a Video Open Channel System would permit those watching video content to replicate a TV room experience of commenting on television programs being watched. While an important part of the audio Open Channel System resides in the ability given to users (or at least the supervising DJ) to select and control the program content, content control may be less important in a Video Open Channel System where the emphasis would be on providing viewers who are watching the same video content with the ability to have a concurrent conversation with those who have an interest in the same show.

The Video Open Channel System may be used in conjunction with systems offering selected programming on an "on-demand" basis. These systems include Video-On-Demand (VOD) programming offered by cable televisions systems, and Internet Protocol Television (IPTV) systems in which television programs or other video content are distributed to subscribers or viewers using a broadband connection over Internet Protocol. On demand programming is commonly provided in parallel with the subscriber's Internet or cable connection, supplied by a broadband or cable operator using the same infrastructure but over a dedicated bandwidth allocation. A Video Open Channel System would provide an additional conversation channel used by those who are concurrently watching the same content, and would include mechanisms for launching the simulcast of the program content to two or more different "listeners" as well as determining who these participants would be, using many of the same methods describe here for an audio Open Channel System.

In one useful form, a conversation channel would be made available for live programming (such as the broadcast of sports events) and any listener who chose to watch such a program could also elect to join in a conversation channel. Because a large number of viewers may be watching a given program, the number of participants in a given conversation channel available to a given viewer would be limited, and new participants would be added only if the number of existing participants in that channel was below a threshold limit. If no space is available in a previously launched conversation channel, a new channel would be created. To insure better balance in the number of participants in each channel, a new participant would be added to that channel having the fewest number of participants. Since many participants will chose to leave a conversation channel, the participants in two channels having less than a given number of participants may be joined in a new combined session, thereby tending to optimize the number of participants. As in an audio Open Channel System, private conversation connections could be requested.

A Video Open Channel System would provide a control interface consisting of screen displayed menus and prompts, to which the user could respond using the same remote control device normally used for program selection and control to implement the control functions needed for the operation of an Open Channel Receiver.

As noted in connection with audio Open Channel Systems, the conversation channel may include images or live motion videos of the participants who are contributing to the conversation. In a Video Open Channel System, these video "conversation" images may be presented in a "Picture in Picture" (PIP) window on the display screen, which can be turned ON or OFF by the viewer. The PIP picture could thus appear on demand, or when the other party spoke, or even moved, perhaps in a certain way. A Video Open Channel System may thus provide the streaming of three unique streams: the video entertainment steam, the audio conversation overlay, and the user webcam video or images in a further stream. Alternatively, the audio and video components of a conversation stream may be presented in a separate channel for display on a separate monitor. As one example, a cellular phone with a video display screen could be used to provide conversation and images relating to a television program being watched by other participants using conventional television receivers. The identification of a television program being watched by a given participant could be used by the service provider to automatically switch the participant using the device (e.g. a cellular phone) to a different conversation channel connecting other participants who are watching the programming most recently selected. As another example, the display screen in an automobile, such as the screen used by GPS navigation systems and other functions, may be used to provide the video content from other participants who are listening to the same programming other OCRs, as well as to provide a display menu for the control interface used for the Open Channel System. In an Open Channel System used in a car, a web cam mounted on the dashboard could capture the image of the driver, and the main audio feed would be rendered using the car's existing audio system.

In still another mode, a conversation group could mutually agree on a particular program to watch together, and each participants program channel would automatically switch to that program. In this mode, the group selects programming to watch, which could include the simultaneous launch of previously recorded on demand programming. Thus, a group may choose to watch a specific music video together from an IPTV source, or might elect to watch a movie together from and VOD cable provider. While IPTV and VOD systems permit a conversation group to choose a desired show from a menu or via a search engine, programming might also be selected by a DJ who "surfs" through available programming being broadcast until a consensus is reached by other viewers on what to watch. A vote taking scheme might be used stay on a particular channel until a majority of the participants express a desire to move on to something else. Multiple surfing expeditions, where each person and thus increase the power of the search by having multiple parties doing it at once. In fact, it is during this search process, that the audio overlay might be most useful.

Using a related capability discussed before, a person viewing or listening to video or audio content may wish to affirmatively request another person to join the experience. For example, a view might transmit a request to one or more persons on a buddy list, indicating that they are currently viewing a particular program, and asking that they join in the session.

Creating a Open Channel

In the preferred implementation, the user would create an Open Channel by starting to play his own music stream through the handset. Such music can be streamed from memory on the handset, or from other local memory such as an iPod®, or be streamed from a remote server. Before or after the music started, a command by the user would convert the music stream to an Open Channel. At this point, the system would allow other calls to share the stream as if it were a conference call.

An Open Channel could become more "formalized" and "persistent" by giving it a name, attributes and other metadata such as the genre of music played, the creator's name, location of the creator, and times of the day (the morning commute, for instance) that the Open Channel was typically active. Such Open Channels would be "persistent", albeit perhaps only active for certain periods.

The DJ Function

An Open Channel could also have an operator (or DJ) who was not the creator. In this way, multiple people could manage and run an Open Channel at various points in time.

In some cases, the DJ function could be a joint, or distributed function among two or more people. This would be similar to how a car full of people might decide which radio station to listen to—any one in the front seat (the joint DJs) could reach over and change the channel.

In a more decentralized model, Open Channels could also function with no DJ (i.e. no central control). Following the analogy above, in this case, anybody in the car would have an equal opportunity to change the channel. An Open Channel could have any number of algorithms for users of the Open Channel to offer up songs or playlists to play. Acceptance could be on a first-come-first-serve basis, or there could be a voting mechanism. The same processes could be used in performing other DJ functions described below-accepting new listeners, selecting a conversation format, etc.

An Open Channel could also have playlists scheduled to be played even when the creator's phone was not on and without a supervising DJ. Such pre-scheduled play would operate in the same manner as that of an attended Open Channel, typically with the operation of the conversation channel being automated.

A user participating in an Open Channel session would have the ability use his phone as he normally would. For instance, if another phone call came in while a user was listening to an Open Channel, the incoming call would be handled just like a second call coming in now is handled. Call Waiting alerts the user who can then make the decision whether to put the Open Channel System on hold and take the call, leave the Open Channel System call and take the incoming call, or ignore the incoming call completely.

DJ Handoffs

Normally the creator of an Open Channel "station" will be the DJ. While a session is in progress, the assigned DJ can solicit others to take over the function and assign channel control to another user. This could be done via a handoff set up ahead of time, or could be done interactively on the fly by having the DJ issue a request to the Open Channel Controller for a listener to take over.

Once a listener was selected for the task, and accepted, the control interface functions that are performed to control the Open Channel would become accessible as available menu options on the Open Channel Receiver used by the newly assigned DJ. Such controls would include among others, settings for talk participation, audience size, and playlist additions and changes.

Finding and Joining an Open Channel

There might any number of Open Channels in operation at any moment in time, some of which are produced by parties known to the user and others generated by strangers. As such, there would need to be an efficient means to locate and choose between available Open Channels. In addition, inactive channels can be defined, located and activated by authorized users. A variety of methods may be employed to identify, locate, and join an Open Channel, as illustrated by the following examples:

1. A user could have one or more "Open Channel Buddy Lists" stored with the participant data at 170. These buddy lists may be defined as stored at the time a user registers with the system or while the system is in use in much the same way that PC users set up IM accounts. If any of the user's buddies had created an Open Channel or were listening to one, it would be indicated on the Buddy List. The user could then click on a Buddy to signal a desire to join that Open Channel. The creator of the Open Channel could reject or accept the request. Alternatively, the Open Channel could be set up so that anybody could join without a request being needed. Simple communication between buddies could be facilitated such that if a user wanted a buddy to get a playlist started, that request could be easily signaled. Text messaging would be one method to communicate between Open Channel users.

2. A less systematic means of joining an Open Channel would entail dialing the phone number of someone who may be playing music at the time. The system could indicate via a graphic or text display on the handset if the dialer buddy had an Open Channel open before or after the call was dialed. The caller, having dialed, could then request to join and listen to the Open Channel or to request that a regular phone call be put through.

3. Open Channels may be assigned descriptive names or identifiers in the same way that chat rooms on the Internet are commonly named. Such channels could persist over time and exist even when no users are on those channels. Names of such Open Channels could be input using text input or voice recognition or selected from a menu.

4. By the same token, Open Channels could be made searchable by the metadata associated with each one. Thus, a user could select the "Search" option on the menu (at which point he could show up on Buddy Lists as in Search mode) and type in "hip-hop" and be directed to a list of associated Open Channels that include the descriptor "hip-hop" in their metadata. Other searchable metadata might include information such as what time of day the Open Channel is likely to be active, whether talk-over is allowed, audience size limits, etc. Multiple metadata fields might be employed to sort listings of known Open Channels is desired sort orders.

5. A more passive means of Open Channel selection, the "Find Me Something" could allow the system to match the user's musical preferences with active stations playing similar music. The user could be taken to the Open Channel most likely to match those preferences, or be given a short list to choose from. Users of such options may register their musical preferences with the system, and the system could deduce such preferences from past listening, as well. The mechanisms for storing user preference information, and deriving user preference information from a user's prior selections and use of the system, and selecting desired programming based on such stored preference information, are described in the above-noted U.S. Pat. No. 5,721,827 issued to James D. Logan et al. on Feb. 24, 1998 entitled "System for Electrically Distributing Personalized Information," the disclosure of which is incorporated herein by reference.

6. Collaborative filtering could be used to enhance searches. That is, the system could look at other users with preferences and past listening habits similar to the user and note which channels they were consistently listening to.

7. For Open Channel Receivers equipped with GPS location detectors, channels could be associated with a location using, for example, the techniques described in U.S. Pat. No. 6,788,766 issued to James D. Logan on Sep. 7, 2004 entitled "Methods and apparatus for providing location dependent cellular telephone communications." Using this feature would allow a user to drop in the playlist of someone standing beside them, or in the same building, in the same community, etc. Open Channels devoted to topics or themes unique a particular location can be created. For example, Open Channels devoted to local news and weather, and supporting conversations devoted to local topics, may be automatically identified and listed based on the current location of a GPS Open Channel Receiver. Advertising supported Open Channels (see the Section devoted to Advertising below) can be simulcast in different versions, with different local advertising being directed to Open Channel Receivers which are in a given geographic region as automatically indicated by the GPS data, or selected based on a descriptive Open Channel Name (e.g. "What's Happening in Atlanta").

The system could present Open Channel options such that only those Open Channels that are currently active and in progress would be listed on the some selection menus and made accessible. Alternatively, inactive Open Channels could be indicated as well, and selection of one of these could send a request to start a playlist from that Open Channel; that is, inactive channels may be activated on the request of an interested listener (who may or may not be assigned the role of DJ for the newly activated channel). Inactive Open Channels would include persistently stored Open Channels that were not currently playing a playlist.

Search functions mentioned above could be done on a more convenient platform such as a PC with the results being usable at the handset.

As indicated at 123 and 125 in FIG. 1, any Open Channel that is available via a cellular or wired telephone network may also be made available via the Internet to operators of personal computer, or WiFi equipped telephones or other portable communications devices. Handheld devices may use a WAP interface to select Open Channels, select and manipulate playlists and perform other functions typically performed by a DJ, as well as to listen to and comment on the programming stream from an active Open Channel. When a personal computer is used, a conventional web browser (Microsoft Explorer®, Mozilla Firefox®, Opera®, etc.) may be used to interact with a web server interface to an Open Channel Controller, and because of enhanced screen displays, larger keyboards, a mouse pointing device, etc., a more robust interface may be employed. In addition, when a PC is used, locally stored program segments may be uploaded into the content library 150 where they may be identified by playlists and shared with other users.

Open Channels that Find Listeners

In addition to users who search for Open Channels to listen to, DJs and Open Channel creators could search for listeners in several ways:
1. When an Open Channel is created or activated, an SMS text message or the like may sent to users to alert likely listeners, or
2. A telephone call could automatically be placed, or a command may be pushed via the Internet to a connected listener, that would automatically connect the party being called to the music stream once the Open Channel Receiver answered the call or accepted the invitation to join the active Open Channel session.

Open Channel Playlist and Metadata

When perusing a list, or listening to a specific Open Channel, the user would be able to see playlist information such as the name of the song currently being played, the artist, and the genre, and similar information about other songs in the playlist. Depending on the limits of the screen display being used, this information might be immediately available or may require commands to be input in order to be accessed. The DJ in control of an Open Channel can display a list of the segments (e.g. songs) on a playlist, and control the playback point in the playlist, skipping undesired segments, jumping to other segments, replaying segments already played, etc. frequently, the DJ may respond to requests for particular segments expressed by participating listeners as the comment on the program stream.

In a similar way, users would be able to access metadata about the Open Channel itself, including the genre of music played, the creator, or other information that might be made available. As noted earlier, this metadata may be used to search for and select desired Open Channels, and may also be displayed as descriptive information to a user listening to a particular Open Channel.

In addition, data could be made available regarding who was listening to an Open Channel at a given moment to the extent listeners were identifiable. For example, a listener might view a list of other users who are already listening in an active Open Channel before deciding to join or while they are connected. Audience participation patterns and size could also be displayed, as well as broadcast duration, history of broadcasts, etc.

If the user "clicks on" the name of another listener that appears on a list, descriptive information about that person may be displayed base on that person's stored metadata, preferences, prior listening patterns, etc. Each user may limit the presentation of such information to preserve their privacy by identifying what information is to be made available, and to whom.

Switching Open Channels

Several mechanism may be used to navigate between Open Channels as illustrated by the following examples:

A user could returning to Open Channels already visited could in several ways; for example, by displaying and selecting from a "history list" of the most recently visited channels, or by affirmatively saving selected channels to a "favorites list" or to one of a set of "preset buttons" (or "speed dial buttons") such as those used in radios and telephones to give instant access to frequently listened-to Open Channels.

The user may employ the equivalent of a "scan" button of the kind commonly found on FM/AM radios. Pressing this button would give the listener a short snippet of audio from each channel in a given list before moving on to the next channel on the list. The user can simply re-hit the scan button or indicate in some other way to stop changing channels. Scan buttons are particularly useful in those situations where it is inconvenient to visually inspect a list while searching for desired content. In those instances where listeners are being taken from channel to channel, the system would strive to immediately provide audio from the song being played on that channel. To facilitate this function, a "highlights" passage in a song, or a short descriptive spoken announcement, may be recorded for each Open Channel (for example, at the beginning of each playlist, and this "snippet" could be transmitted before the listener is connected to the "live" content feed from the active channel. In this way, users could rapidly make decisions and move quickly from Open Channel to Open Channel until a channel with desire content is identified.

If the user had selected an Open Channel via the "Find Me Something" function, that function could continue to monitor the chosen Open Channel's playlist. If it varied too much from the type of music preferred by the user, it could automatically jump to a new station or present alternatives that could be chosen by the user.

Audience Size and Composition

The Open Channel DJ could have control over the number of listeners, or the number of active listeners (those contributing to talk-over), that could be admitted to a specific Open Channel. Such limits might be needed if it was important to allow enough "air time" for users to contribute audio comments between songs. Such control parameters might be shown as attributes of an Open Channel, or might be instituted by the DJ without "publication" or even created or changed on the fly.

Furthermore, the DJ could control who was allowed to both listen and participate in his Open Channel while he was the DJ in the same way that a host of a party might control who and how many people would be able to attend a private event. Again, these rules and results might be published or not published, and arbitrary in nature or rules-based.

If needed, the Open Channel creator or DJ could break large crowds into smaller audiences all hearing the same music if. In this case, the creator could not partake, of course, in the audio discourse occurring on every station at the same time. But the DJ could cast audio that would be heard by everybody on all the Open Channel sub-audiences, and he could also converse with participants in individual Open Channels as desired.

Such "clustering" of listeners could be done "manually" by the DJ, or could be done automatically by the system based on connections between listeners, music affinities, or other user-metadata known to the server.

Sources and Uses of Digital Music

The digital music played on an Open Channel can originate locally from storage on the phone itself or storage on a connected or device or one networked to the phone. In such cases, the copyright status of the content might need to be confirmed in order to make it available to others, or a royalty tracking and payment system could be needed to stay within current copyright law. Locally originated content would need to be streamed to a server for distribution over the system to users who would tune into that particular Open Channel.

Alternatively, music could originate from a remote server, which could be controlled by the phone operator or by an independent party that would then make use of the conference-calling or similar capability offered by the operator. Ideally, the server would have access to a large number of songs and a royalty scheme would cover whatever content was played from the server.

When music is streamed from such a server, all of the Open Channel System users would have access to the same music making it easier for all users to share and contribute to a playlist-activities that may be limited if the music is coming from a proprietary stream or server.

The community of users could contribute to the music on the server by uploading content that was not copyrighted. Websites such as MySpace® that contain non-copyrighted files could be scraped for content that would match the preferences of specific Open Channel audiences. Alternatively, instead of copying such content to the central server, or set of servers, it could be streamed from the originating website and re-streamed through the Open Channel System.

The playback of music from a MOT would typically be through an OCR. In other cases, however, the stream could be channeled to another playback device such as a stereo system or played through a speaker phone allowing multiple people in one location can hear the Open Channel and participate in the conversation. In such a situation, there would be social listening going on locally, as well as over the Open Channel.

Playlist Creation

Playlists could be generated in advance or the DJ can pick songs as he or she goes along. Creators of Open Channels would have various means of creating playlists in advance and importing them from other devices. Such playlists could be used as a control means to direct the streaming of songs stored on the system's remoter server or locally. Ideally, the system would allow an individual Open Channel to "search for" the needed content specified in a playlist in any number of locations.

Playlists could be created on a PC, taken off of a personal music player such as iPod®, exist already on a phone with memory, or be stored on a website such as MySpace®. Song names and related metadata from such playlists coming from other sources could similarly be incorporated into an Open Channel System playlist, so long as the content was available to be played to Open Channel System users (see Copyrights below).

The Open Channel System would also save playlists that had flowed over its servers in the past allowing other DJs to borrow and reuse playlists or parts thereof to incorporate into their own playlist. Such "slicing and dicing" of playlists could be done on the handset, but more preferably would be done on a PC or system with a larger display.

Software could be employed to automatically create playlists from the pool of available music. Such constructions could be based on parameters and data input by the DJ, such as characteristics of the expected or actual audience, the degree to which the DJ or audience wishes to explore new music or music played less frequently, etc. Such software could be used to randomize selections comprising an existing playlist, or to try to form sensible playlists based on logical song-order rules and known metadata about songs—a function long performed by the industry-leading "Selector" software used by professional radio stations.

Users would also be able to create and use their own private playlists that would not necessarily be shared via an Open Channel. Such users, however, would also be able to tune into Open Channels and listen and participate even though they did not create Open Channels themselves. Such private playlists could make use of the same software available to DJs. Both types of playlists, private ones and public ones intended for use on Open Channels, could be composed by extracting all or some of the songs titles contained on others' playlist. A user-friendly graphical interface would allow users to view playlists and cut and paste all or part of any other public playlist and import it into their set of playlists. Songs could appear on multiple playlists and editing tools would allow the order and composition of playlists to be easily changed.

Playlists may also be created "on the fly" as it is being played. The DJ controlling an active Open Channel may leave a current song designated by the playlist playing while the DJ looks for other things to play. The DJ may also respond to spoken requests from other participants on the conversation channel by adding requested music to the playlist for playback at an appropriate future time.

Once a program segment has played, the playlist to that point may be saved as a record of the selections played. In addition, the conversation channel that accompanies a playlist may be saved for later playback. If the Open Channel is configured to allow conversation to occur only between program segments, then each conversation segment between program segments may be recorded as a separate segment, and the playlist as recorded can contain a pointer to the saved conversation segment. In that way, the entire session, including the conversation, may be reproduced at a later time, and that playlist may be edited to retain only the "best" of the conversation segments which can be expected to be of interest to future listeners. When two or more participants elect to have a private conversation, that conversation would typically not be recorded or included in a playlist that is made publicly available; however, a private version of the playlist contain references to the recorded private conversation could be provided to the participants in the private conversation, preserving a record of that conversation.

When the Open Channel is operating in a mode that permits the conversation channel to be operative while a program segment is playing from the playlist, the "conversation track" may be separately recorded as a separate file, and the playlist can contain periodic pointers to offset locations in the recorded conversation track, permitting the later synchronized playback of the playlist selections and the recorded conversation, forming a replica of the original session.

Users would also be able to cut and paste playlists and export them out of the system for use elsewhere, for instance as playlists that could control the playing of songs on other services such as Rhapsody®. Conversely, playlists created for services such as Rhapsody®, could be imported into the Open Channel System.

User ID and Profile Creation

Users would have the option to input information about themselves, information that would be stored as a "profile" and perhaps associated with a "screenname". Such information could comprise demographic information, data regarding musical tastes by genre, band, and specific song, preferences for DJ and Open Channel styles, links to websites such as MySpace® which might include more personal data, social network type information, a MySpace® screen name, etc. In addition, users would be encouraged to include photos and other information that would facilitate the Open Channel System to function as a social network for interested users. This information could be used in when establishing parameters around which software could construct playlists for groups of listeners.

Communal Playlist Creation

Listeners could also have the opportunity to contribute music to the playlist of the Open Channel to which they were listening. This could be done by offering one or more playlists, or parts thereof, to the DJ, which could then be used by him to enhance his own playlist. Single songs could be offered in the form of a "request".

In a more peer-to-peer structure, two or more users could form an Open Channel and merge together playlists that were designated to play on that Open Channel. Software could be employed to manage the construction in real time of such new playlists from the contributed song base, or users could "manually" construct the playlists.

Group-Based Collaborative Filtering

In this "Communal Playlist Mode", the software-generated playlists would become a function of who the listeners are, their musical preferences, their explicit requests and the listening characteristics of these users as known by an Open Channel System server. Such user data for the selection software could be derived from profile information provided by the user or derived from an Open Channel System server that would be able to monitor user listening habits.

The Open Channel System's server(s), via a connection to the Internet, could construct or supplement communal playlists by crawling or mining the social network sites to which communal users belonged extracting content preferences. New music, to the extent the group expresses a desire to hear different material, could be gleaned from the preferences of "friends" on such sites.

An Open Channel playlist could be further elaborated by consulting sources that produce recommendations of similar music (such as the Music Genome Project).

The collaborative filtering (CF) technology employed by the Open Channel System would differ markedly from traditional CF systems to reflect the more democratic context of social listening. Prior CF algorithms all produce recommendations that optimize individual satisfaction, given preferences and history and the preferences of similar individuals.

The Open Channel System CF system could apply a set of rules to balance individual preferences against group preferences and consensus and enhance the immediate shared experience based on actions of the listeners. Some example rules are given below:

Individual preferences take priority over generic or inferred recommendations.

Shared preferences take priority over individual preferences

Individual requests take priority over shared preferences

Group consensus (votes) take priority over individual requests.

Dedications take priority over group consensus if the recipient is active.

Active listeners (those participating in the conversations) preferences take priority over non-active users.

New content takes priority over recently-heard content.

The rules could be applied dynamically as listeners join and leave the Open Channel. For example, if several active listeners have recently heard a song on another Open Channel, that song might be omitted from the current Open Channel stream. However, if those listeners log off, the playlist would dynamically recalculate to add the previously omitted song. These rules and relative priorities could be adjusted dynamically by the DJ.

Playlist Interactivity and Modification

Users would have several means by which to interact within an Open Channel in addition to speaking (described below):

Users could "request" songs, bands, or genres to be played by sending a text message to the Open Channel or the DJ. (Voice recognition could also be used to input such message strings.) Such a request could be recognized by any playlist software being used. Alternatively, a request could be made verbally to the DJ during conversations between songs but that would be outside the software structure of the system.

Users could also request that a message they recorded be played immediately or before or after a song. Such an 'announcement' could be recorded and slotted into the audio stream automatically, indicating where in the upcoming playlist the announcement should go. Such an announcement could be linked to a song, for instance, used as a "dedication" for a song about to be played, or it can be a pre-recorded snippet of conversation that is slotted into the general audio stream based on a non-song criteria.

Alternatively, such an announcement could be sent to just a subset of all the listeners of an Open Channel. This could be done by selecting the names off of a list of the Open Channel audience or via voice command.

Announcements could also be forwarded to Buddies and others and passed from user to user and cross from Open Channel to Open Channel Announcements can persist and "stick" with a song or be ephemeral.

Users could "vote" for or against any upcoming selection. Votes to Skip a selection count against its rating and votes to "Play Now" increase its rating. Such interactions could be used to change the order of the playlist in addition to deleting specific selections. Such expressions of preference are associated with Open Channels and the users who input them and are retained by the server for use later when playlists are synthesized to reflect group preferences.

The DJ could have veto power over any selection made by users and can similarly preview and delete announcements before they play on the station.

Playlist, DJ, and Open Channel Ratings

Metadata could be associated with any given playlist. Objective information could include the date the playlist was created, the date it was modified, how many users had listened to it (assuming it was re-used), how much had been listened to by users, what songs had been skipped, who created it, etc. In addition, users would also have the opportunity to rate individual Open Channels, specific DJs and playlists.

Other subjective information, including text and audio comments posted by listeners could also be made available. All such information about playlists, however, would only being useful if the playlist was persistent and able to be used over again.

Such information could be used by the system when search are run, or viewed by users as they peruse playlists for use.

DJs and persistent Open Channels could in a similar fashion also have metadata associations. Such metadata could include the experience level of the DJ, audience size, as well as the rating that users could provide about Open Channels and DJs. Such ratings could reflect the quality of their playlists (even if never re-used), as well as other subjective factors, such as the composition of their audiences, quality of the talk between songs, and the personality of the Open Channel.

Of particular interest would be ratings of Open Channels, DJs, and playlists offered by users with similar tastes. Such collaborative filtering would be helpful in combing through large numbers of Open Channels and finding ones of interest.

The system could also offer real-time data concerning the popularity of certain Open Channels. Such data could include the current audience size and how fast it was growing. More specific recommendations could be driven by, again, looking at activity by users similar to the user doing the search.

Conversing on a Open Channel

One of the unique aspects of the Open Channel System would be the ability to converse with other members of the audience while the "show is going on". Open Channels could offer several modes of conversing. One would be a completely open line that allowed talk-over on top of the music at any time." This could be thought of as the "Party Mode" as people could converse and listen to music at the same time. The creator or DJ or other participants would have the option to turn down or pause the music in order to focus more on the conversation.

A more restricted mode would allow talk-over by anyone listening but only at the beginning and end few seconds of a song, much in the same manner that radio DJs talk over only the beginning and end of songs. Another mode would only allow such talk between songs.

Talk could be restricted to the Open Channel's DJ, to any listener, or to certain listeners, much in the same way that it is on traditional radio, particularly talk radio. In fact, the DJ, or someone assisting him, could screen calls while songs were being played. Each Open Channel could be configured to allow for "open mikes" or, alternatively, users would have to input a "talk" command to gain the ability to add audio to the stream-in much the same way that "push-to-talk" phones work.

Open Channels with limited numbers of users on at a time could offer the benefit of displaying a list of those listening. When someone spoke, such participation could be noted on the list. Stored histories of conversation patterns could inform DJs and other users as to the input expected from specific users.

In cases where there was a small base of listeners, the medium might even transform itself into a private phone call as the DJ stopped playing music in favor of talk. He might also winnow down the number of listeners to personal friends.

If the number of listeners to a particular station was too large to display at any point in time, the system could just display on the handset those users known to a particular user.

When groups of listeners become too large, clustering software could be used to break apart the group into subgroups, each listening to the same music. Any conversation generated by that group would be only be heard by members of that group, and the DJ if he chose to join.

Users would have the option to screen out conversations if they just wanted to hear the music. Ideally, they would have the option to screen out, or screen in, specific contributors. In addition, the DJ or creator could have the ability to let someone listen but not participate in the conversation.

Control software could be employed to monitor the line for conversation. When speaking had stopped between songs, or declined to a low level, the software could start the next song on the playlist.

In order to cue the system to allow an interval for talk, the system could also recognize timely commands from the DJ. Providing voice recognition input for the limited command set for DJ and listeners would facilitate ease of use in mobile environments.

The DJ could create his own "Open Channel personality" by allowing certain modes of communicating. Such metadata about an Open Channel could be displayed when searching for Open Channels to tune into.

Open Channel-Based Social Networking

Private calls could also be carried on between any pair or groupings of users. This feature could be enabled by selecting one or more users from the displayed list of users tuned in to a particular Open Channel.

The existence of the private call could also be displayed so that other users could see that such a call was in progress or its existence could remain private. Such private call would not necessarily be controlled by the rules set up by the DJ concerning allowed talk times. Furthermore, the participants could mutually decide to turn down or off the music.

Private calls could be established without the users ever actually obtaining the phone numbers of the partying partaking of the call.

Such conversations could not be heard by the DJ or other listeners. Users would have the option of preventing themselves from being contacted in this fashion by all other users or just certain ones, or alternatively, they could construct a "white list" of users allowed to contact them.

A social network could evolve around the connections users develop between themselves as they conversed over and around the songs being played. Buddy lists, white lists, and lists of users with whom one had had contact, could all be used to infer and discover the music-based social network.

If users registered with the social network aspect of the site, they would be able to view or obtain data regarding friends of their friends. In addition to information about musical preferences, such data might include the Open Channel they were currently tuned to.

Several types of new connections could be made between users of the Open Channel System:
1. A user could simply tune into the Open Channel being listened to by somebody of interest
2. A user could request to join a conversation between songs where that person is participating.
3. A user could send an announcement to a specific person, or make a more general announcement or dedication.
4. A user could establish a private phone call with another user.
5. Finally, there would be opportunities to connect via the Open Channel System website and email.

The social-networking function could be further enhanced by displaying personal data about users as they entered and participated in conversations, sent announcements, etc. Such data could include photos or videos of users and could even include live video at the time the connection was made. In addition, such profile information could be accessed by clicking the name of a user.

In addition, email could be used to connect Open Channel System users with each other. The Open Channel System could host on-line email addresses, as well as store the regular email addresses of users. With appropriate authorizations, users could thereby obtain the email addresses of other users.

Note that in conversations carried on during Open Channel System sessions where users can connect with each other using their handsets, phone numbers are not necessarily exchanged but could be if desired.

Associated Open Channel Website

Many functions, such as building one's social network, inputting personal data, rating Open Channels, or searching for new Open Channels to listen to, would be best done using a browser on the website, although it would be also possible in limited form using the handset GUI. Therefore it would be advantageous to have a parallel Open Channel System website where such activities could take place.

Such a website could provide functions such as registration and subscription functions, accounting functions to manage and update subscriber accounts, permit the subscribes to provide profile information and set preferences, establish Buddy Lists, white lists, etc. While these functions can be provided via a handset, users will often find it more convenient to perform these and related functions using a web browser. Information supplied or edited using a browser can be easily communicated to the Open Channel System servers and handsets when needed. Conversely, information generated using Open Channel Receivers can be viewed and manipulated from the website. Note that all information accessible from the handset would also be available on-line. Such information would include profile data, playlist composition, etc.

The Open Channel System Inboxes

If users hear a song, announcement, or other content selection that they would like another the Open Channel System user to hear, they can click to automatically "Forward" it to all their friends, selected friends, other users, or other Open Channels representing groups of other listeners. Selections that are forwarded from other users appear in the recipient's the Open Channel System Inbox. Users can access items in their Inbox via their handset or by signing on to the Open Channel System website. In addition to content, users could tag profile information, search information, Open Channel IDs, playlists, and other Open Channel System-based information and forward it to other Open Channel System users. The methods and apparatus for exchanging audio messages described in the above-noted U.S. Pat. No. 5,732,216 issued to James D. Logan et al. on Mar. 24, 1998 entitled "Audio Message Exchange System" may be used to advantage in the Open Channel System, and the disclosure of that patent is incorporated herein by reference.

Time-Shifting

As audio streams could be saved on the Open Channel System server, a single user or several listening together would have the opportunity to go back in time and rewind the audio broadcast on an Open Channel. When listening to any time-shifted content, users would have access to a complete set of "trick play controls", including skip, rewind, and fast forward. During the replay of an Open Channel session, if allowed by the DJ, these time-delayed listeners could also interact with the stream in the same ways they could with a live Open Channel broadcast. Announcements and new conversations could then be part of the new audio recording. The methods and apparatus described in U.S. Reissue Pat. No. Re36,801 issued on Aug. 1, 2000 to James D. Logan et al. entitled "Time delayed digital video system using concurrent recording and playback" may be employed to pause, replay, rewind and fast forward content in both the content stream and in the conversation link. Note that, when an Open Channel is being listened to on a time-shifted basis, comments made by the listeners will not be in proper synchronization with the comments of other listeners and with the live playback of content being experienced by other listeners. As a consequence, the ability of the listener to transmits comments may be automatically disabled (e.g. by opening switch 272) when the content is being listened to on a delayed basis.

When listening to time-shifted recordings, users would also have the opportunity to leave out the non-musical audio. Playlist selection software would also have the ability to edit the content stream to a user's taste, as well.

Audio streams could also be "fast-forwarded into the future" by holding the FF key for a certain length of time or by selecting a future selection off of the playlist. When playing audio representing the "future", users would simply be playing the playlist as it is presented by the Open Channel. During this time, users could skip songs and navigate at will through the audio stream. In all cases of time-shifting, of course, what the user hears will no longer be what standard, live listeners of an Open Channel would be hearing and the ability to converse with others will with regard to the live content others are hearing would be inhibited.

Users would also have access to a "Bookmark" function. That is, at any time, a user could save their place in a playlist on a particular channel and return to that playlist later, provided that the source of the music files was persistent and available at a time later than the original playing. In this manner, such channels can be time shifted.

Copyright Cost Allocation

The existence of copyrights on music streamed across the Open Channel System could require the payment of royalties to artists/performers and publishers/songwriters regardless of whether the content was stored locally or on the Open Channel System servers.

If content was originated locally, and its copyright was unknown, "fingerprinting" software, or similar systems, could be used to identify the songs as they were played. Such software works by taking snippets, or fingerprints, of each song and comparing them to a database of song fingerprints looking for matches. Large databases of copyrighted song fingerprints exist and could be used to identify most copyrighted works as they played. Non-copyrighted works, such as titles downloaded off of MySpace®, would be noted as not having a match in the fingerprint database and thus no copyright fees would need to be paid.

Content stored on the Open Channel System servers, on the other hand, could already be tagged with its copyright status. When such music was streamed, the relevant royalties could be easily accrued.

In addition to tracking the copyright status of each song played, the system would also track the playlist "play pattern". Such monitoring looks for how often songs from the same artist are played, if songs are repeated etc. If certain play pattern conditions were met, then the broadcast would be deemed to resemble an Internet broadcast and Internet radio royalties would be applicable.

If these conditions were not met, for instance if the playlist was disclosed in advance, a different royalty regime would apply and perhaps performance fees would need to be paid. In all cases, the Open Channel System would characterize the play patterns used, compute the proper royalties, and make sure the fees were paid in appropriate manner.

Another method of addressing the copyright issue would be to require all the Open Channel System users to be subscribers to a service such as Rhapsody®. Such a service, gives users the right to access on demand, as often as they wish, songs from a large library of titles. The Open Channel System service could presumably negotiate access to this database of songs and allow users access to it in order for it to be used as the basis for streaming on the system. Under such an arrangement, issues such as pre-publication of the playlist and users making multiple specific requests would not be actions that generated incremental royalty payments.

A hybrid model would require all DJs and those who create Open Channels to be subscribers to a service such as Rhapsody® that offers music on demand with no restrictions on playlist construction. Such a subscription would cover the creation of the Open Channel playlist and the ability of the DJ to listen to it.

When such a playlist was listened to by other Open Channel users, however, they would not be hearing songs-on-demand as they did not directly create the playlist. Thus, these secondary listeners might accrue lower fees a kin to Internet Radio royalties.

The Open Channel System could inform DJs and Open Channel creators as to the copyright regime within which they were operating and the fees that were being accrued. If the copyright method of accrual changed during a certain time period, the Open Channel System could track this as well.

The Open Channel System would be capable of allocating royalties owed in numerous ways, and when such fees were allocated, they could be "marked up" when passed along to users in order to cover other the Open Channel System costs and to provide a profit to the service.

Under one method, incremental royalties accrued due to audience listening could therefore be charged to the Open Channel creator under a system where such Open Channels were considered "private property" and creators were responsible for paying all costs associated with them. On the other hand, such royalty expenses could be charged to the users themselves and added in some form to their individual phone bills. Another method of allocating costs would be for all users (including creators) to be charged a flat fee per time period, a pool of revenue from which all royalties would be paid. Methods for monitoring usage, paying content owners a royalty, and charging users a royalty of the use of copyrighted works, are described in the above noted U.S. Pat. No. 5,721,827 issued to James D. Logan et al. on Feb. 24, 1998 entitled "System for Electrically Distributing Personalized Information," the disclosure of which is incorporated herein by reference.

Bandwidth Cost Allocation

The Open Channel System server could track bandwidth consumed during shared usage. Such bandwidth costs would typically be proportional to the "user-minutes" spent on the system. Usage could be billed in a manner similar to how phone minutes are billed today-with peak minutes costing more than off-peak.

Knowing that music listening is of lesser value than one-to-one conversation, the phone operator would likely tend to charge a lower rate for the Open Channel System listening, knowing that that demand would be quite elastic with the price charged, and that the number of minutes used could be quite large if the price was set low enough. As such, the carrier could use the Open Channel System as a means to sell unused bandwidth without cannibalizing revenue from conversation-minutes.

The carrier could bill users separately for bandwidth and royalty costs so that users could see that artists were being directly supported from the service.

The carrier could alternatively decide to charge a flat rate for the Open Channel System usage regardless of minutes used. A means to allocate bandwidth during peak time periods could be necessary and could include strategies such as restricting service if bandwidth was unavailable, or restrict the ability of new listeners to join existing Open Channels if the carrier's system was too busy.

A payment system could also be implemented such that users of Open Channels could pay various amounts to Open Channel creators or the DJs themselves. Such payments could flow through the phone operator's billing system, through the Open Channel System billing system to subscribers, or in a more peer-to-peer system, directly from user to the Open Channel creator or DJ.

In particular, the Open Channel creator could present a "Donate" option which would allow users to "tip" or donate money to Open Channel creators. Such an informal payment system could encourage everyday listeners to open up their playlists to others. Such payments could flow through the Open Channel System and be sent to Open Channel creators or used to offset monies owed for royalty payments and/or bandwidth.

Advertising

The cost of Open Channel streams could also be supported in whole or part via advertising revenue. Revenue from such ads could be retained by the phone operator, the operators of the Open Channel System service, or the Open Channel creator. Alternatively, the ad revenue could be paid directly to the copyright holders or their representative (for instance, the operator of the Rhapsody® service) in exchange for all or part of owed copyright and performance fees.

Ads could include visual ads that could be displayed on the handset's display, particularly when the user is likely to be looking at the display-for instance, when retrieving search results.

Audio ads could also be interjected into streams between songs. Given that the Open Channel System would a "micro-broadcasting medium", it would not be expected that many Open Channel operators would be able to sell and organize the placements of ads. As such, it would be preferable that the Open Channel System aggregate ads, or use an ad aggregation service such as AdMarc, and place ad on those Open Channels receptive to ads. (The decision to accept ads could be made on an individual channel basis or on a system-wide basis by the operator of the Open Channel System.) The DJs, however, could have the prerogative of deciding where in the audio stream the ads went.

Audio ads could be targeted in multiple ways. Given that personal and demographic information may be known about users, ads, both audio and text-based, could be targeted to take advantage of common traits among the audience.

Furthermore, if the audio ads were the same length, then ads could be targeted to very small groups, or even individuals. Different users could hear different ads, all of which played during the same time period, allowing common music listening to resume after the audio ad was over.

The system could also be constructed such that certain users could avoid hearing audio ads and instead could use that time for conversation. Such an arrangement might require that such users paid a subscription fee to avoid ads. In this manner, listening to audio ads could be a form of payment used by listeners. Methods for adjusting subscription fees to reflect a subscriber's willingness to listen to ads, and related techniques, are described in the above noted U.S. Pat. No. 5,721,827 issued to James D. Logan et al. on Feb. 24, 1998 entitled "System for Electrically Distributing Personalized Information," the disclosure of which is incorporated herein by reference.

Purchasing Music

Users may wish to purchase music heard on a particular Open Channel. Such purchases might include obtaining a song on a CD, purchasing the album on which a certain song appeared, downloading the song in digital form, etc. Such purchases could be facilitated by offering a "Buy Button" on the Open Channel System interface allowing the user to purchase the song playing at the time the option was selected, or to select a song off of a playlist displayed by the system.

Such a purchase could be debited against the user's Open Channel System account, the user's phone account, or to another account set up ahead of time or at the time of purchase.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A system, comprising:
a transmission station configured to:
deliver a first music stream to a plurality of participating users over one or more program transmission pathways substantially simultaneously, wherein the first music stream is delivered as an ordered sequence of music segments specified by a playlist defined by a first person having a role of selecting music for the first music stream;
concurrently enable spoken conversation between ones of the plurality of participating users over one or more bidirectional communications pathways communicatively coupling the plurality of participating users to the transmission station during or after delivery of the first music stream;
receive a request from the first person to assign the role of selecting music for the first music stream to a second person; and
in response to the request, allow the second person to select music segments specified by the playlist.

2. The system of claim 1, wherein the second person is one of the plurality of participating users.

3. The system of claim 1, wherein the transmission station is configured to:
modify the playlist defined by the first person in response to requests received from one or more of the plurality of participating users, wherein the requests include votes for an upcoming music segment to be delivered.

4. The system of claim 1, wherein the transmission station is configured to:
receive a request from one of the plurality of participating users to purchase a music segment associated with the first music stream.

5. A system, comprising:
one or more computers configured to implement a controller operable to:
deliver media content substantially simultaneously to a plurality of receiving devices associated with a plurality of users, wherein the media content includes a plurality of media streams including a first media stream, wherein the controller is configured to deliver media segments for the first media stream in accordance with a playlist defined by a first of the plurality of users;
receive audio communications from one or more of the plurality of receiving devices;
convey the audio communications to one or more others of the plurality of receiving devices as part of delivery of the media content;
receive a request from the first user to assign a role of selecting media segments for the first media stream to a second of the plurality of users; and
in response to the request, permit the second user to define the playlist.

6. The system of claim 5, wherein the controller is operable to:
receive a request to modify the playlist from one of the plurality of users; and
modify the playlist in accordance with the request.

7. The system of claim 5, wherein the plurality of media streams includes a second media stream having a playlist that is created by a user other than one of the plurality of users.

8. The system of claim 5, wherein the controller is operable to:
collect votes from the plurality of users about music segments of the first media stream; and
modify the playlist based on the collected votes.

9. The system of claim 5, wherein the controller is operable to deliver ones of the plurality of media streams to the plurality of receiving devices in parallel via a plurality of channels.

10. The system of claim 5, wherein the media content includes video content, and wherein the audio communications include spoken content captured by microphones at the one or more receiving devices.

11. A method, comprising:
a subscriber device receiving media content broadcasted from a controller system, wherein the controller system substantially simultaneously broadcasts the media content to a plurality of other subscriber devices, wherein the media content is broadcasted in accordance with a playlist defined by a first user of one of the plurality of other subscriber devices;
during receiving the media content, the subscriber device recording audio content of a second user of the subscriber device;
the subscriber device conveying the recorded audio content to the controller system, wherein the controller system is configured to convey the recorded audio content to one or more of the plurality of other subscriber devices in conjunction with broadcasting the media content; and
the subscriber device presenting an interface that allows the second user to define the playlist in response to the first user assigning a role of selecting media content to the second user.

12. The method of claim 11, further comprising:
the subscriber device sending, to the controller system, a request to add a segment of media content to the playlist.

13. The method of claim 11, further comprising:
the subscriber device sending, to the controller system, a request to purchase a segment of the media content.

14. The method of claim 11, further comprising:
the subscriber device creating another playlist defined by the second user of the subscriber device, wherein the other playlist defines an ordering to deliver content to the plurality of other subscriber devices; and
the subscriber device sending the other playlist to the controller system to cause the controller system to deliver content in the ordering.

15. The method of claim 11, further comprising:
the subscriber device receiving, from the second user, a request to contact users at the one or more other subscriber devices, wherein the recording and the conveying are performed responsive to the request.

16. The method of claim 15, wherein the request is for a private conversation with the users, and wherein the controller system is configured to convey the audio content to only the one or more other subscriber devices.

* * * * *